US012130944B2

(12) United States Patent
Sato et al.

(10) Patent No.: US 12,130,944 B2
(45) Date of Patent: Oct. 29, 2024

(54) INFORMATION TRANSACTION DEVICE, INFORMATION TRANSACTION METHOD, AND PROGRAM

(71) Applicant: NEC Corporation, Tokyo (JP)

(72) Inventors: Yusuke Sato, Tokyo (JP); Yasumasa Mitsuhata, Tokyo (JP); Masashi Inoue, Tokyo (JP); Yurika Michishita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/768,551

(22) PCT Filed: Oct. 7, 2020

(86) PCT No.: PCT/JP2020/037989
§ 371 (c)(1),
(2) Date: Apr. 13, 2022

(87) PCT Pub. No.: WO2021/085064
PCT Pub. Date: May 6, 2021

(65) Prior Publication Data
US 2024/0119173 A1    Apr. 11, 2024

(30) Foreign Application Priority Data

Oct. 31, 2019    (JP) ................................. 2019-198431

(51) Int. Cl.
*G06F 21/62*    (2013.01)
(52) U.S. Cl.
CPC ................. *G06F 21/6254* (2013.01)
(58) Field of Classification Search
CPC ................................. G06F 21/6254
See application file for complete search history.

(56) References Cited

U.S. PATENT DOCUMENTS 9,833,725 B2 *   12/2017   Watry ..................... H04L 67/12
2009/0276825 A1    11/2009   Hatakeyama et al.
(Continued)

FOREIGN PATENT DOCUMENTS

JP    2004-192353 A    7/2004
JP    2006-350813 A    12/2006
(Continued)

OTHER PUBLICATIONS

International Search Report for PCT Application No. PCT/JP2020/037989, mailed on Dec. 22, 2020.
(Continued)

*Primary Examiner* — Stephen T Gundry

(57) ABSTRACT

An information transaction device is connected to an information holding device including a storage unit storing personal information and includes a sharing approval reception unit configured to receive approval of sharing of the personal information by an information sharing destination device from a user associated with the personal information, a provision approval reception unit configured to receive approval of provision which is transmission of the personal information to an information provision destination device, from the user associated with the personal information, a sharing instruction unit configured to, in a case where the sharing approval reception unit receives the approval of the sharing, instruct the information holding device to perform the sharing, and a provision instruction unit configured to, in a case where the provision approval reception unit receives the approval of the provision, instruct the information holding device to perform the provision.

7 Claims, 11 Drawing Sheets

(56) References Cited

U.S. PATENT DOCUMENTS

| | | | |
|---|---|---|---|
| 2015/0033356 A1* | 1/2015 | Takenouchi | G06F 21/6254 726/26 |
| 2015/0100347 A1* | 4/2015 | Nikam | G16H 10/60 705/3 |
| 2015/0149322 A1* | 5/2015 | Teraoka | G06Q 30/0283 705/26.43 |
| 2017/0251985 A1* | 9/2017 | Howard | G16H 70/60 |
| 2021/0133343 A1* | 5/2021 | Soeda | G06F 21/6245 |
| 2022/0012740 A1* | 1/2022 | Bacastow | G06Q 20/0855 |
| 2022/0067724 A1* | 3/2022 | James | G06Q 20/325 |
| 2022/0198448 A1* | 6/2022 | Ilincic | G06Q 20/352 |
| 2022/0309463 A1* | 9/2022 | Heffron | G06Q 40/04 |
| 2022/0374550 A1* | 11/2022 | Yagi | G06Q 50/18 |
| 2022/0398556 A1* | 12/2022 | Grassadonia | G06Q 20/385 |
| 2023/0252533 A1* | 8/2023 | Brandt | H04L 63/104 705/38 |
| 2023/0289811 A1* | 9/2023 | Patel | G06Q 20/3278 |
| 2023/0325957 A1* | 10/2023 | Bloy | G06Q 50/265 705/38 |
| 2023/0342780 A1* | 10/2023 | Buch | G06Q 20/40145 |
| 2023/0410082 A1* | 12/2023 | Cheek | G06Q 20/29 |
| 2023/0418974 A1* | 12/2023 | Hockey | G06Q 40/12 |
| 2024/0062173 A1* | 2/2024 | Sahni | G07G 1/01 |

FOREIGN PATENT DOCUMENTS

| | | |
|---|---|---|
| JP | WO2010/067535 A1 | 5/2012 |
| JP | 2015-103111 A | 6/2015 |
| JP | 2016-053693 A | 4/2016 |
| JP | 2016-091067 A | 5/2016 |
| WO | 2007/148562 A1 | 12/2007 |

OTHER PUBLICATIONS

Japanese Office Action for JP Application No. 2021-554253, mailed on Apr. 4, 2023 with English Translation.

\* cited by examiner

FIG. 2

| PERSONAL IDENTIFICATION CODE | NAME | SEX | AGE | DATA ACQUISITION DATE | DATA ACQUISITION INSTITUTION CODE | VITAL SIGN 1 (BODY TEMPERATURE) | VITAL SIGN 2 (HEART RATE) | VITAL SIGN 3 (RESPIRATION) | VITAL SIGN 4 (BLOOD PRESSURE) | TEST ITEMS | TEST RESULT | DIAGNOSIS RESULT |
|---|---|---|---|---|---|---|---|---|---|---|---|---|
| | | | | | | | | | | | | |

FIG. 7
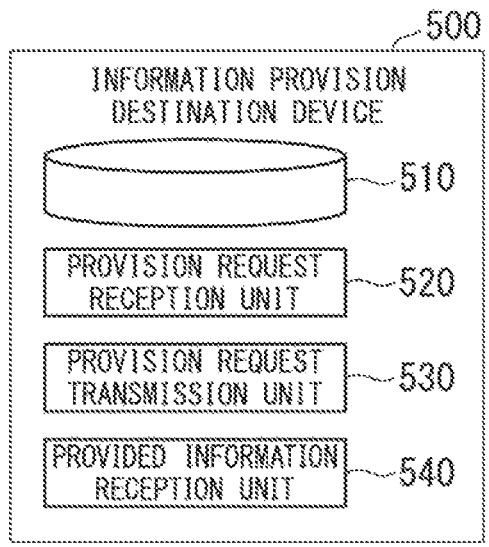
FIG. 8
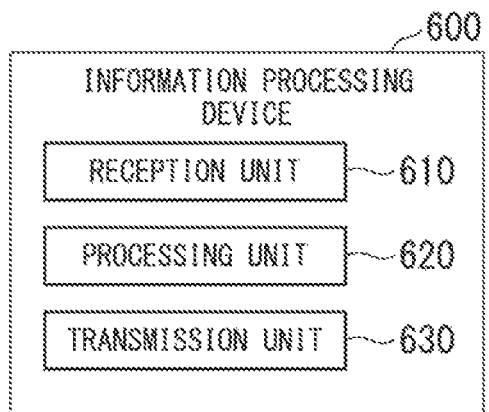
FIG. 9
| AMOUNT | TYPE | PRICE |
|---|---|---|
| LESS THAN OR EQUAL TO 10 SETS | X | A YEN |
| EXCEED 10 SETS | X | B YEN |
| LESS THAN OR EQUAL TO 10 SETS | Y | C YEN |
| EXCEED 10 SETS | Y | D YEN |

FIG. 10

| AMOUNT | TYPE | PRICE |
|---|---|---|
| LESS THAN OR EQUAL TO 10 SETS | J | E YEN |
| EXCEED 10 SETS | J | F YEN |
| LESS THAN OR EQUAL TO 10 SETS | K | G YEN |
| EXCEED 10 SETS | K | H YEN |

FIG. 11

| USER 20 | INFORMATION HOLDING DEVICE 300 |
|---|---|
| 0.6 | 0.3 |

FIG. 12

| USER 20 | INFORMATION HOLDING DEVICE 300 |
|---|---|
| 0.7 | 0.2 |

INFORMATION TRANSACTION DEVICE, INFORMATION TRANSACTION METHOD, AND PROGRAM

This application is a National Stage Entry of PCT/JP2020/037989 filed on Oct. 7, 2020, which claims priority from Japanese Patent Application 2019-198431 filed on Oct. 31, 2019, the contents of all of which are incorporated herein by reference, in their entirety.

TECHNICAL FIELD

The present invention relates to an information transaction device, an information transaction method, and a program.

BACKGROUND ART

Patent Document 1 discloses a policy change input device that, when a request for changing a privacy policy is made from a user, compares an existing privacy policy with an updated privacy policy and, in a case where it is determined that personal information cannot be used anymore by another provider, transmits a deletion request to the other provider.

Patent Document 2 discloses a technology for providing transparency in distribution of personal information by causing an operator device to receive utilization conditions from a user device and a utilizer device, extract personal information matching both conditions, and transmitting the personal information to the utilizer device.

Patent Document 3 discloses a technology for receiving transmission of a disclosure request for personal information, determining whether or not the personal information is present in a database, in a case where the personal information is present, determining whether or not it is difficult to specify a service utilizer using a predetermined threshold, and in a case where the difficulty is greater than or equal to the threshold, responding with the personal information corresponding to the disclosure request.

PRIOR ART DOCUMENTS

Patent Documents

[Patent Document 1]
 PCT International Publication No. WO2007/148562
[Patent Document 2]
 Japanese Unexamined Patent Application, First Publication No. 2016-091067
[Patent Document 3]
 Japanese Unexamined Patent Application, First Publication No. 2006-350813

SUMMARY OF INVENTION

Problems to be Solved by the Invention

There is a system that shares personal information held by an operator by permitting another operator to refer to the personal information based on personal consent. Meanwhile, provision of the personal information by transmitting the personal information to a data application operator desiring application of the personal information based on the personal consent is performed by a different system. In such a manner, approval of sharing of the personal information and approval of provision of the personal information are performed in different systems, and an effort related to the approval is hard and complicated.

An object of the present invention is to provide an information transaction device, an information transaction method, and a program that solve the above problem.

Means for Solving the Problems

An information transaction device according to the present invention is connected to an information holding device including a storage unit storing personal information and includes a sharing approval reception unit configured to receive approval of sharing of the personal information by an information sharing destination device from a user associated with the personal information, a provision approval reception unit configured to receive approval of provision of the personal information to an information provision destination device, from the user associated with the personal information, a sharing instruction unit configured to, in a case where the sharing approval reception unit receives the approval of the sharing, instruct the information holding device to perform the sharing, and a provision instruction unit configured to, in a case where the provision approval reception unit receives the approval of the provision, instruct the information holding device to perform the provision.

An information transaction method according to the present invention includes receiving, by a sharing approval reception unit included in an information transaction device connected to an information holding device including a storage unit storing personal information, approval of sharing of the personal information by an information sharing destination device, from a user associated with the personal information using the information transaction device, receiving, by a provision approval reception unit included in the information transaction device, approval of provision of the personal information to an information provision destination device from the user associated with the personal information, instructing, in a case where the sharing approval reception unit receives the approval of the sharing, the information holding device to perform the sharing, and instructing, in a case where the provision approval reception unit receives the approval of the provision, the information holding device to perform the provision.

A program according to the present invention causes a computer connected to an information holding device including a storage unit storing personal information to function as sharing approval reception means for receiving approval of sharing of the personal information by an information sharing destination device from a user associated with the personal information, provision approval reception means for receiving approval of provision of the personal information to an information provision destination device from the user associated with the personal information, sharing instruction means for, in a case where the approval of the sharing is received, instructing the information holding device to perform the sharing, and provision instruction means for, in a case where the approval of the provision is received, instructing the information holding device to perform the provision.

Advantageous Effects of the Invention

According to at least one aspect of the above aspects, the approval of the sharing of the personal information and the approval of the provision of the personal information can be performed in one device. Thus, an effort related to the approval can be reduced.

BRIEF DESCRIPTION OF DRAWINGS

FIG. 2 is a table showing an example of personal information according to the first embodiment.

FIG. 7 is a block diagram showing a configuration of an information provision destination device according to the first embodiment.

FIG. 8 is a block diagram showing a configuration of an information processing device according to the first embodiment.

FIG. 9 is a table showing an example of sharing price information according to the first embodiment.

FIG. 10 is a table showing an example of provision price information according to the first embodiment.

FIG. 11 is a table showing an example of sharing price distribution information according to the first embodiment.

FIG. 12 is a table showing an example of provision price distribution information according to the first embodiment.

EXAMPLE EMBODIMENTS

First Embodiment

<<Configuration of Information Transaction System>>

Figure 1:
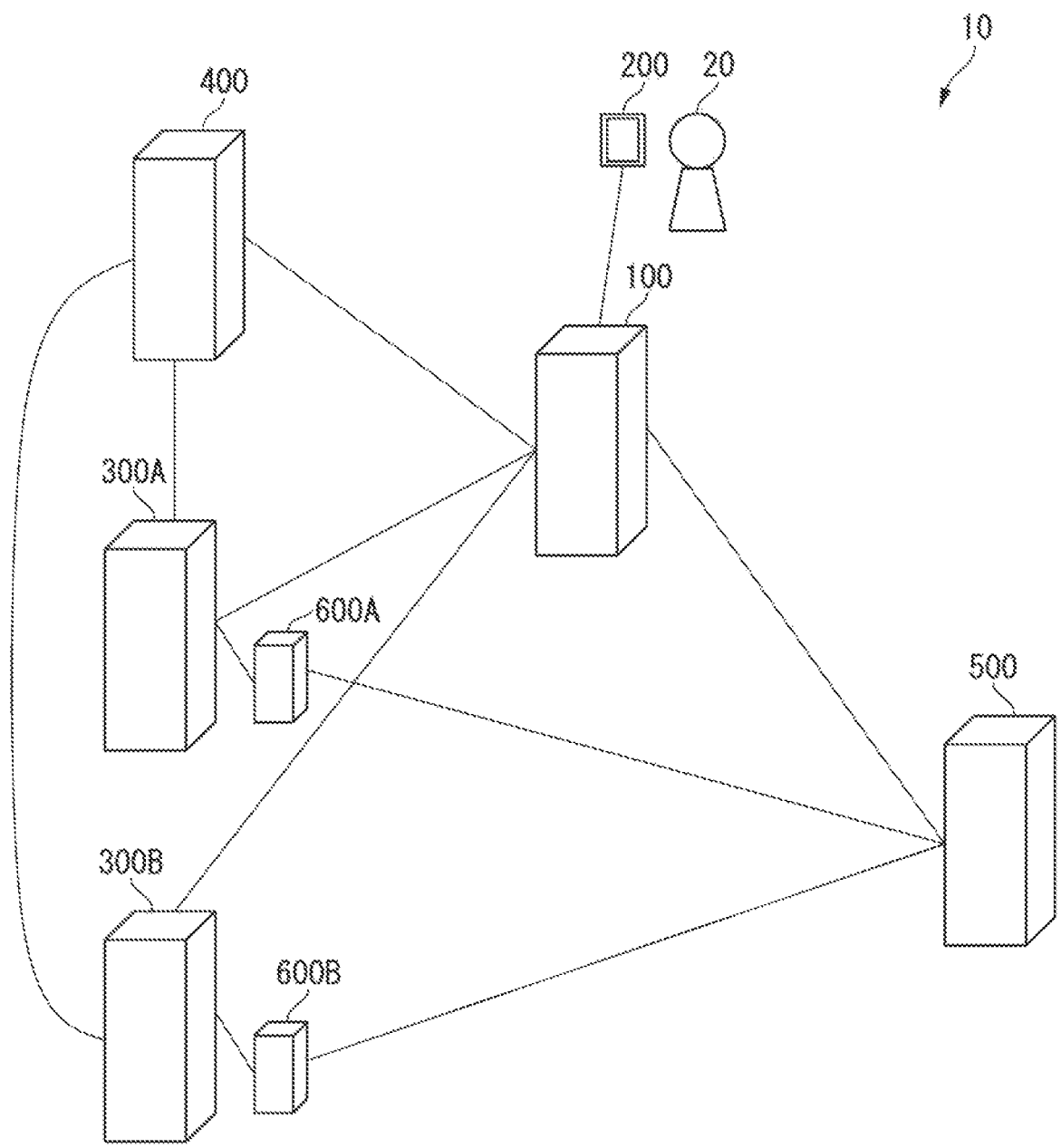
FIG. 1 is a block diagram showing an information transaction system according to a first embodiment.

Hereinafter, embodiments will be described in detail with reference to the drawings. FIG. 1 shows a configuration of an information transaction system 10 according to a first embodiment.

The information transaction system 10 includes an information transaction device 100 that receives approval of sharing of personal information and approval of provision of the personal information in one device. Thus, this system can reduce an effort related to approval. The information transaction system 10 includes the information transaction device 100, a user terminal 200, an information holding device 300, an information sharing destination device 400, an information provision destination device 500, and an information processing device 600. While the information transaction system 10 shown in FIG. 1 includes an information holding device 300A and an information holding device 300B as the information holding device 300, the information transaction system 10 may be configured to include a different number of information holding devices 300. While the information transaction system 10 shown in FIG. 1 includes an information processing device 600A and an information processing device 600B as the information processing device, the information transaction system 10 may be configured to include a different number of information processing devices. In the following description, the information processing device 600A and the information processing device 600B may be simply referred to as the information processing device 600.

Sharing refers to causing the information holding device 300 to set a state where an operator having the information sharing destination device 400 can refer to personal information of the information holding device 300. That is, in the sharing state, the information holding device 300 transmits the personal information of the information holding device 300 any number of times in accordance with a reference request until a predetermined time limit from a predetermined operator. Provision is transmission of the personal information of the information holding device 300 once to a personal information application operator having the information provision destination device 500. In the sharing state, the information holding device 300 may be in a state of transmitting the personal information up to a predetermined number of times (once or a plurality of times) in accordance with the reference request.

FIG. 2 shows an example of the personal information. The example of the personal information shown in FIG. 2 consists of a personal identification code, a name, a sex, an age, a data acquisition date, a data acquisition institution code, a vital sign 1 (body temperature), a vital sign 2 (heart rate), a vital sign 3 (respiration), a vital sign 4 (blood pressure), test items, a test result, and a diagnosis result.

Figure 3:
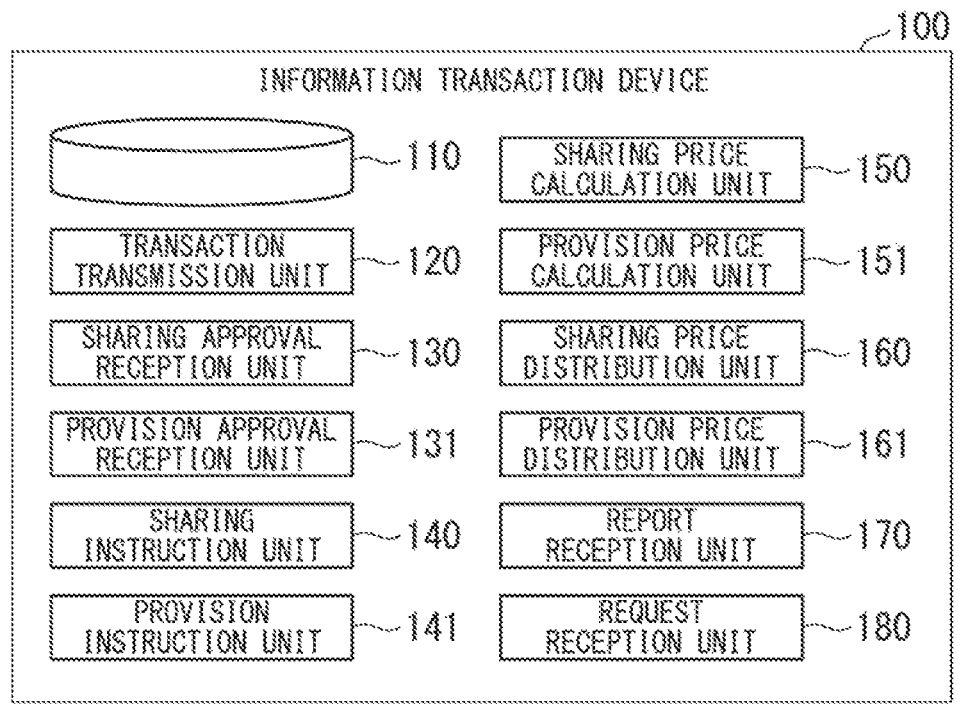
FIG. 3 is a block diagram showing a configuration of an information transaction device according to the first embodiment.

FIG. 3 shows a configuration of the information transaction device 100. The information transaction device 100 includes a transaction storage unit 110, a transaction transmission unit 120, a sharing approval reception unit 130, a provision approval reception unit 131, a sharing instruction unit 140, a provision instruction unit 141, a sharing price calculation unit 150, a provision price calculation unit 151, a sharing price distribution unit 160, a provision price distribution unit 161, a report reception unit 170, and a request reception unit 180.

Figure 4:
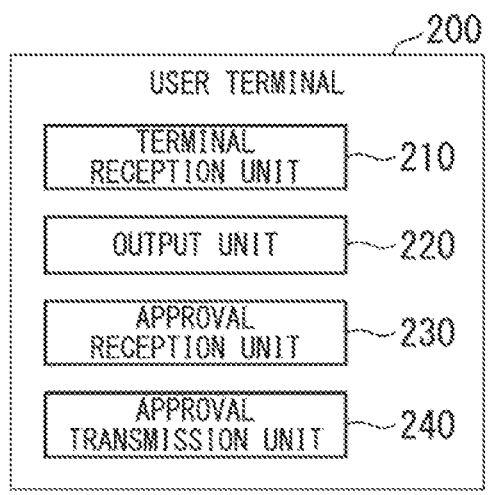
FIG. 4 is a block diagram showing a configuration of a user terminal according to the first embodiment.

FIG. 4 shows a configuration of the user terminal 200. The user terminal 200 includes a terminal reception unit 210, an output unit 220, an approval reception unit 230, and an approval transmission unit 240. A personal computer and a mobile terminal are exemplary examples of the user terminal 200. A smartphone and a tablet terminal are exemplary examples of the mobile terminal.

Figure 5:
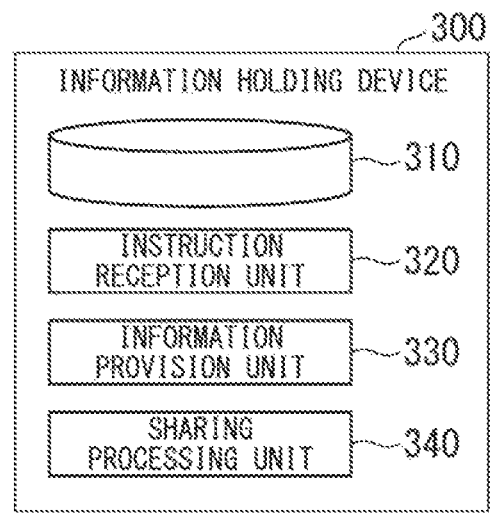
FIG. 5 is a block diagram showing a configuration of an information holding device according to the first embodiment.

FIG. 5 shows a configuration of the information holding device 300. The information holding device 300 includes a storage unit 310, an instruction reception unit 320, an information provision unit 330, and a sharing processing unit 340. Examples of the information holding device 300 include a device of an operator such as a hospital holding personal information of a user 20.

Figure 6:
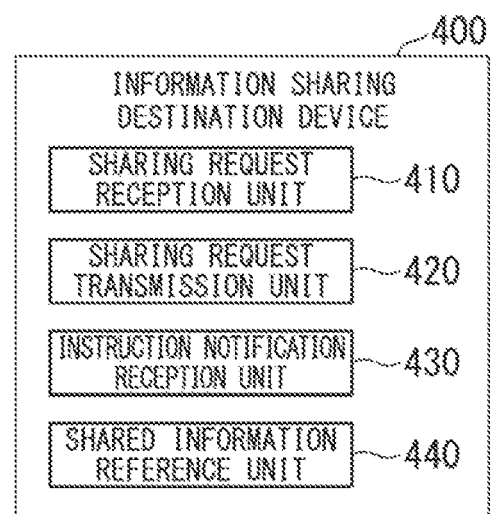
FIG. 6 is a block diagram showing a configuration of an information sharing destination device according to the first embodiment.

FIG. 6 shows a configuration of the information sharing destination device 400. The information sharing destination device 400 includes a sharing request reception unit 410, a sharing request transmission unit 420, an instruction notification reception unit 430, and a shared information reference unit 440. A device of an operator such as a hospital different from the hospital having the information holding device 300 is an exemplary example of the information sharing destination device 400.

FIG. 7 shows a configuration of the information provision destination device 500. The information provision destination device 500 includes a provision destination storage unit 510, a provision request reception unit 520, a provision request transmission unit 530, and a provided information reception unit 540. A personal information application operator such as a retail company that applies the personal information of the user 20 is an exemplary example of the information provision destination device 500.

FIG. 8 shows a configuration of the information processing device 600 (600A and 600B). The information processing device 600 includes a reception unit 610, a processing unit 620, and a transmission unit 630.

<<Configuration of Information Transaction Device 100>>

Hereinafter, the configuration of the information transaction device 100 will be described with reference to FIG. 3.

The transaction storage unit 110 stores sharing price information, provision price information, sharing price distribution information, and provision price distribution information. An on-premises storage and a cloud storage are exemplary examples of the transaction storage unit 110.

The sharing price information is information in which an amount, a type, and a price of personal information related to sharing are associated with each other.

FIG. 9 shows an example of the sharing price information. In the example in FIG. 9, the amount of personal information is in units of data set numbers. In addition, the price shown in the example in FIG. 9 is the price of the personal information of one user 20. The provision price information is information in which the amount, the type, and the price of personal information related to provision are associated with each other.

FIG. 10 shows an example of the provision price information. In the example in FIG. 10, the amount of personal information is in units of data set numbers. In addition, the price shown in the example in FIG. 10 is the price of the personal information of one user 20. A sharing price is a price paid to the operator having the information holding device 300 by the operator having the information sharing destination device 400. A provision price is the price paid to the operator having the information holding device 300 by the personal information application operator having the information provision destination device 500.

The sharing price distribution information is information in which the user 20, the information holding device 300, and the distribution ratio related to the sharing price are associated with each other.

FIG. 11 shows an example of the sharing price distribution information. In this example, the distribution ratio corresponding to the user 20 is 0.6, and the distribution ratio corresponding to the information holding device 300 is 0.3. The provision price distribution information is information in which the user 20, the information holding device 300, and a distribution ratio related to a provision price are associated with each other.

FIG. 12 shows an example of the provision price distribution information. In this example, the distribution ratio corresponding to the user 20 is 0.7, and the distribution ratio corresponding to the information holding device 300 is 0.2.

In a case where the request reception unit 180 receives a sharing request, the transaction transmission unit 120 transmits the sharing request to the user terminal 200. In addition, in a case where the request reception unit 180 receives a provision request, the transaction transmission unit 120 transmits the provision request to the user terminal 200. In addition, the transaction transmission unit 120 transmits the sharing price to the information sharing destination device 400 and transmits the provision price to the information provision destination device 500. In addition, the transaction transmission unit 120 transmits a sharing distribution price and a provision distribution price to the user terminal 200 and the information holding device 300.

The sharing approval reception unit 130 receives the approval of the sharing from the user terminal 200. The provision approval reception unit 131 receives the approval of the provision from the user terminal 200.

In a case where the sharing approval reception unit 130 receives the approval of the sharing, the sharing instruction unit 140 instructs the information holding device 300 to perform the sharing. In a case where the provision approval reception unit 131 receives the approval of the provision, the provision instruction unit 141 instructs the information holding device 300 to perform the provision.

In a case where the report reception unit 170 receives a sharing report, the sharing price calculation unit 150 calculates the sharing price that is the price related to the sharing, by comparing the amount and the type of personal information related to the sharing with the sharing price information stored in the transaction storage unit 110. In a case where the report reception unit 170 receives a provision report, the provision price calculation unit 151 calculates the provision price that is the price related to the provision, by comparing the amount and the type of personal information related to the provision with the provision price information stored in the transaction storage unit 110.

The sharing price distribution unit 160 calculates the sharing distribution prices corresponding to the user 20 and the information holding device 300 by comparing the sharing price with the sharing price distribution information stored in the transaction storage unit 110 and multiplying the sharing price by the distribution ratio. The sharing distribution price is a price paid to the user 20 or the operator having the information holding device 300 by the operator having the information sharing destination device 400. The provision price distribution unit 161 calculates the provision distribution prices corresponding to the user 20 and the information holding device 300 by comparing the provision price with the provision price distribution information stored in the transaction storage unit 110 and multiplying the provision price by the distribution ratio. The provision distribution price is the price paid to the user 20 or the operator having the information holding device 300 by the personal information application operator having the information provision destination device 500.

The report reception unit 170 receives the sharing report or the provision report from the information processing device 600. The request reception unit 180 receives the sharing request from the information sharing destination device 400 and receives the provision request from the information provision destination device 500.

<<Configuration of User Terminal 200>>

Hereinafter, the configuration of the user terminal 200 will be described with reference to FIG. 4.

The terminal reception unit 210 receives the sharing request, the provision request, the sharing distribution price, and the provision distribution price from the information transaction device 100. The output unit 220 displays the sharing request, the provision request, the sharing distribution price, and the provision distribution price received by the terminal reception unit 210 on a touch panel (not shown) included in the user terminal 200. The approval reception unit 230 receives the approval of the sharing and the approval of the provision that are input on the touch panel included in the user terminal 200 by the user 20 through one application. The approval transmission unit 240 transmits the approval of the sharing and the approval of the provision received by the approval reception unit 230 to the information transaction device 100.

<<Configuration of Information Holding Device 300>>

Hereinafter, the configuration of the information holding device 300 will be described with reference to FIG. 5.

The storage unit 310 stores the personal information of the user 20. For example, the storage unit 310 stores a data set of the personal information shown in FIG. 2. In a case where a plurality of users 20 are present, the storage unit 310 stores data sets of personal information of the plurality of persons. An on-premises storage and a cloud storage are exemplary examples of the storage unit 310. The instruction reception unit 320 receives a sharing instruction or a provision instruction from the information transaction device 100. In a case where the instruction reception unit 320 receives the provision instruction, the information provision unit 330 transmits personal information related to the instruction in the personal information stored in the storage unit 310 to the information processing device 600. In a case where the instruction reception unit 320 receives the sharing instruction, the sharing processing unit 340 processes personal information related to the instruction in the personal information stored in the storage unit 310 to a state where the information sharing destination device 400 related to the instruction can refer to the personal information related to the instruction. That is, the sharing processing unit 340 transmits the personal information related to the instruction in accordance with a reference request of the information sharing destination device 400 related to the instruction until a predetermined time limit related to the instruction.

<<Configuration of Information Sharing Destination Device 400>>

Hereinafter, the configuration of the information sharing destination device 400 will be described with reference to FIG. 6.

The sharing request reception unit 410 receives the sharing request that is a request for sharing of the personal information of the user 20 and is input into an input device (not shown) included in the information sharing destination device 400 by a user of the information sharing destination device 400. In a case where the sharing request reception unit 410 receives the sharing request, the sharing request transmission unit 420 transmits the sharing request to the information transaction device 100. The instruction notification reception unit 430 receives an instruction notification from the information transaction device 100. In a case where the instruction notification reception unit 430 receives the instruction notification, the shared information reference unit 440 refers to the personal information related to the instruction in the personal information stored in the information holding device 300.

<<Configuration of Information Provision Destination Device 500>>

Hereinafter, the configuration of the information provision destination device 500 will be described with reference to FIG. 7.

The provision destination storage unit 510 stores personal information received by the provided information reception unit 540. On-premises storage and cloud storage are exemplary examples of the provision destination storage unit 510. The provision request reception unit 520 receives the provision request that is a request for provision of the personal information of the user 20 and is input into an input device (not shown) included in the information provision destination device 500 by a user of the information provision destination device 500. In a case where the provision request reception unit 520 receives the provision request, the provision request transmission unit 530 transmits the provision request to the information transaction device 100. The provided information reception unit 540 receives personal information provided from the information holding device 300.

<<Configuration of Information Processing Device 600>>

Hereinafter, the configuration of the information processing device 600 will be described with reference to FIG. 8.

The reception unit 610 receives personal information transmitted from the information holding device 300. The processing unit 620 anonymizes the personal information received by the reception unit 610. For example, the processing unit 620 replaces the personal identification code and the name in the personal information in FIG. 2 received by the reception unit 610 with random character strings not related to the personal identification code and the name. Alternatively, the processing unit 620 deletes the personal identification code and the name in the personal information in FIG. 2 received by the reception unit 610. The transmission unit 630 transmits the personal information anonymized by the processing unit 620 to the information provision destination device 500.

The processing unit 620 may perform pseudonymization instead of anonymization. For example, the processing unit 620 performs pseudonymization by replacing the personal identification code and the name in the personal information in FIG. 2 with different character strings in accordance with a certain rule. The pseudonymization is performed based on the certain rule. Thus, in the information transaction system 10, even in a case where multiple information processing devices 600 are present, the pseudonymization is performed by converting the same personal identification code and name into the same character strings. Accordingly, even in a case where personal information related to the same personal identification code and name is in different data sets such that the numbers of acquisition dates of the personal information are different, personal information of the same person can be collectively analyzed.

<<Operation Related to Sharing>>

Figure 13:
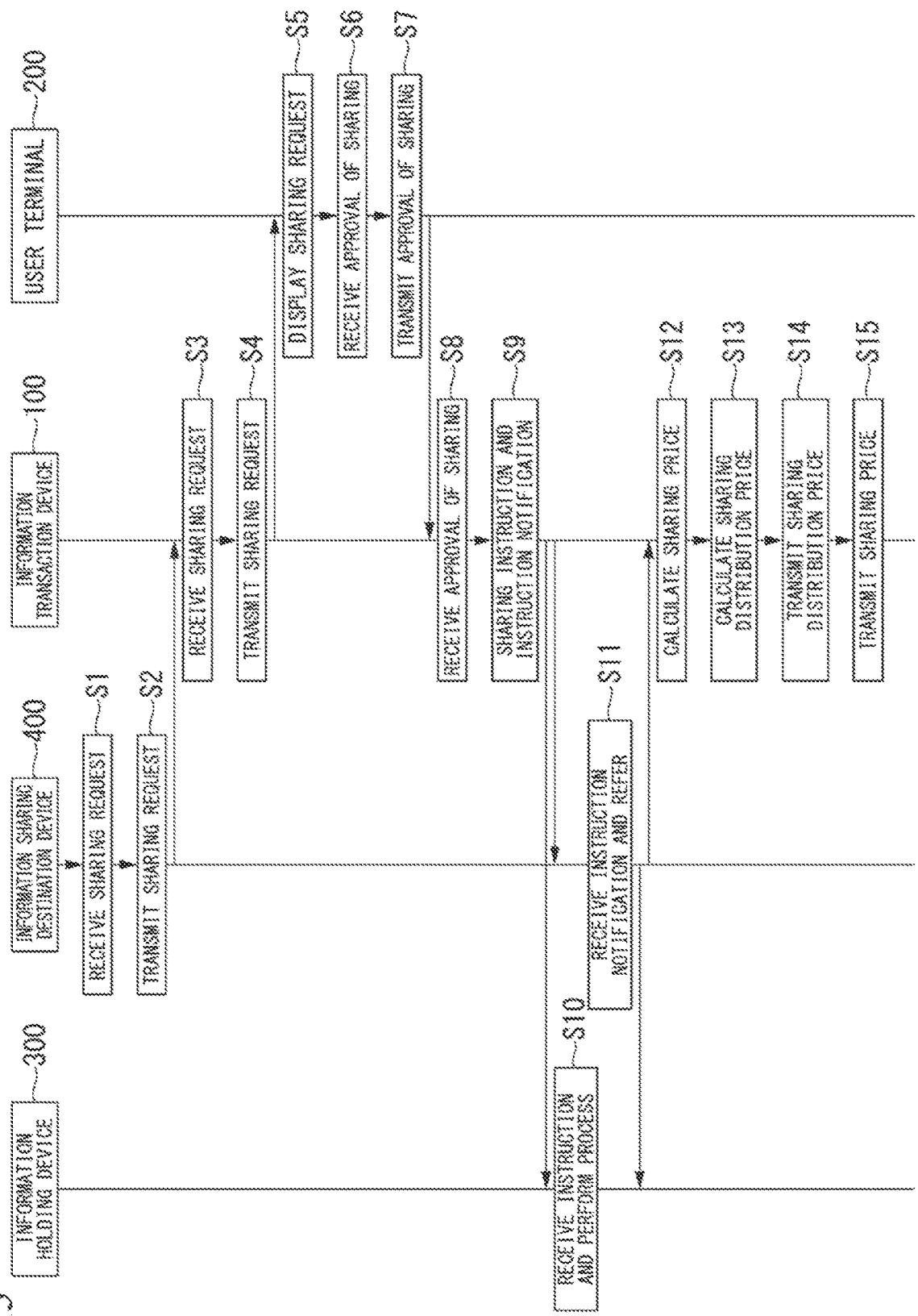
FIG. 13 is a sequence chart showing an operation related to sharing of the information transaction system according to the first embodiment.

Hereinafter, an operation of the information transaction system 10 related to sharing will be described. FIG. 13 shows the operation of the information transaction system 10 related to sharing.

The user of the information sharing destination device 400 inputs the sharing request, which is the request for sharing of the personal information of the user 20, into the input device included in the information sharing destination device 400. The sharing request reception unit 410 receives the sharing request (step S1). The sharing request transmission unit 420 transmits the sharing request received in step S1 to the information transaction device 100 (step S2).

The request reception unit 180 receives the sharing request transmitted in step S2 (step S3). The transaction transmission unit 120 transmits the sharing request received by the request reception unit 180 in step S3 to the user terminal 200 (step S4).

The terminal reception unit 210 receives the sharing request transmitted in step S4. The output unit 220 displays the sharing request received by the terminal reception unit 210 on a display device included in the user terminal 200 (step S5).

The user 20 sees the sharing request displayed on the display device of the user terminal 200 in step S5 and inputs the approval of the sharing into an input device included in the user terminal 200. The approval reception unit 230 receives the approval of the sharing (step S6). The approval transmission unit 240 transmits the approval of the sharing received in step S6 to the information transaction device 100 (step S7).

The sharing approval reception unit 130 receives the approval of the sharing transmitted in step S7 (step S8). The sharing instruction unit 140 issues the sharing instruction related to the approval of the sharing received in step S8 to the information holding device 300. In addition, the sharing instruction unit 140 transmits the instruction notification related to the approval of the sharing received in step S8 to the information sharing destination device 400 (step S9).

The instruction notification reception unit 430 receives the sharing instruction in step S9. The sharing processing unit 340 performs a process for allowing reference when the reference request for the personal information is made from the information sharing destination device 400 (step S10). The instruction notification reception unit 430 receives the instruction notification transmitted in step S9. The shared information reference unit 440 refers to the personal information related to the instruction notification received by the instruction notification reception unit 430 in the personal information stored in the information holding device 300 (step S11).

The sharing price calculation unit 150 calculates the sharing price by comparing the amount and the type of personal information related to the approval of the sharing received in step S8 with the sharing price information stored in the transaction storage unit 110 (step S12). The sharing price distribution unit 160 calculates the sharing distribution price by comparing the sharing price calculated in step S12 with the sharing price distribution information stored in the transaction storage unit 110 and multiplying the sharing price by the distribution ratio (step S13). The transaction transmission unit 120 transmits the sharing distribution price calculated in step S13 to the user terminal 200 and the information holding device 300 (step S14). In addition, the transaction transmission unit 120 transmits the sharing price calculated in step S12 to the information sharing destination device 400 (step S15).

By the above operation, the user 20 can share the personal information of the user 20 to the information sharing destination device 400 and can check a price related to the sharing using the information transaction device 100.

<<Operation Related to Provision>>

Figure 14:
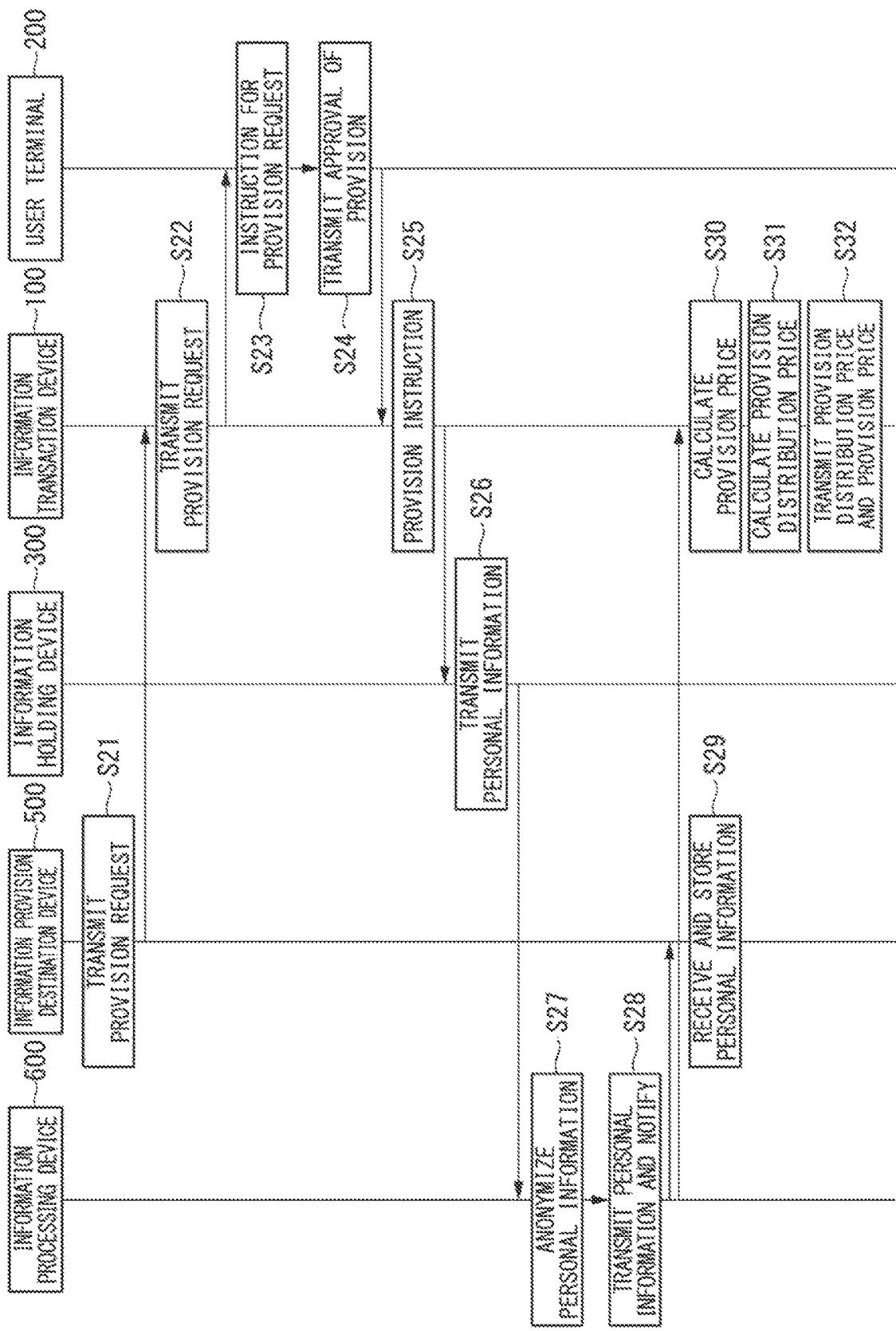
FIG. 14 is a sequence chart showing an operation related to provision of the information transaction device according to the first embodiment.

Hereinafter, an operation of the information transaction system 10 related to provision will be described. FIG. 14 shows the operation of the information transaction system 10 related to provision.

The user of the information provision destination device 500 inputs the request for provision of the personal information of the user 20 into the input device included in the information provision destination device 500. The provision request reception unit 520 receives the provision request which is the request for provision input into the input device included in the information provision destination device 500. The provision request transmission unit 530 transmits the provision request received by the provision request reception unit 520 to the information transaction device 100 (step S21).

The request reception unit 180 receives the provision request transmitted in step S21. The transaction transmission unit 120 transmits the provision request received by the request reception unit 180 to the user terminal 200 (step S22).

The terminal reception unit 210 receives the provision request transmitted in step S22. The output unit 220 displays the provision request received by the terminal reception unit 210 on the display device included in the user terminal 200 (step S23). The user 20 inputs the approval of the provision into the input device included in the user terminal 200 with respect to the provision request displayed in step S23. The approval reception unit 230 receives the approval of the provision input into the input device included in the user terminal 200. The approval transmission unit 240 transmits the approval of the provision received by the approval reception unit 230 to the information transaction device 100 (step S24).

The provision approval reception unit 131 receives the approval of the provision transmitted in step S24. The provision instruction unit 141 instructs the information holding device 300 to perform provision related to the approval received by the provision approval reception unit 131 (step S25).

The instruction reception unit 320 receives the provision instruction in step S25. The information provision unit 330 transmits personal information related to the provision instruction received by the instruction reception unit 320 in the personal information stored in the storage unit 310 to the information processing device 600 (step S26).

The reception unit 610 receives the personal information transmitted in step S26. The processing unit 620 anonymizes the personal information received by the reception unit 610 (step S27). The transmission unit 630 transmits the personal information anonymized in step S27 to the information provision destination device 500. In addition, the transmission unit 630 notifies the information transaction device 100 that the anonymized personal information is transmitted (step S28). The personal information transmitted to the information provision destination device 500 in step S28 is received by the provided information reception unit 540 of the information provision destination device 500 and is stored in the provision destination storage unit 510 (step S29).

The provision price calculation unit 151 calculates the provision price by comparing the amount and the type of personal information related to the approval of the provision received by the provision approval reception unit 131 in step S25 with the provision price information stored in the transaction storage unit 110 (step S30). The provision price distribution unit 161 calculates the provision distribution price by comparing the provision price calculated in step S30 with the provision price distribution information stored in the transaction storage unit 110 and multiplying the provision price by the distribution ratio (step S31). The transaction transmission unit 120 transmits the provision distribution price calculated in step S31 to the user terminal 200 and the information holding device 300. In addition, the transaction transmission unit 120 transmits the provision price calculated in step S30 to the information provision destination device 500 (step S32).

By the above operation, the user 20 can provide the personal information of the user 20 to the information provision destination device 500 and can check a price related to the provision using the information transaction device 100.

In the first embodiment, while the personal information of one user 20 is shared or provided, the personal information of a plurality of users 20 may be shared or provided. In this case, the sharing price or the provision price related to the plurality of users 20 may be collectively calculated. Thus, the information transaction device 100 records record data of sharing or provision in the transaction storage unit 110 and calculates the sharing price or the provision price related to the plurality of users 20 based on the record data.

<<Operational Advantage>

The information transaction device 100 according to the first embodiment is connected to the information holding device 300 including the storage unit 310 storing the personal information and includes the sharing approval reception unit 130 that receives the approval of the sharing which is referring to the personal information by the information sharing destination device 400, from the user 20 associated with the personal information, the provision approval reception unit 131 that receives the approval of the provision which is transmission of the personal information to the information provision destination device 500, from the user 20 associated with the personal information, the sharing instruction unit 140 that instructs the information holding device 300 to perform the sharing in a case where the sharing approval reception unit 130 receives the approval of the sharing, and the provision instruction unit 141 that instructs the information holding device 300 to perform the provision in a case where the provision approval reception unit 131 receives the approval of the provision.

With the information transaction device 100, the user 20 can approve sharing and provision of the personal information of the user 20 using the information transaction device 100 that is one device, and the effort related to the approval can be reduced.

The information holding device 300 is connected to the information processing device 600. The information processing device 600 includes the reception unit 610 that receives the personal information, the processing unit 620 that anonymizes or pseudonymizes the personal information received by the reception unit 610, and the transmission unit 630 that transmits the personal information anonymized or pseudonymized by the processing unit 620 to the information provision destination device 500. The provision is performed by transmitting the personal information to the information provision destination device 500 through the information processing device 600.

With the information transaction device 100, the user 20 of the information transaction device 100 can provide the anonymized or pseudonymized personal information through the information processing device 600. Thus, the information transaction device 100 can improve security related to the provision of the personal information.

In addition, the information transaction device 100 includes the sharing price calculation unit 150 that calculates the sharing price which is the price related to the sharing, by comparing the amount and the type of personal information related to the sharing with the sharing price information which is information in which the amount, the type, and the price of the personal information related to the sharing are associated with each other.

Since the information transaction device 100 calculates the sharing price related to the sharing of the personal information, the user 20 of the information transaction device 100 can easily check the sharing price related to the sharing.

In addition, the information transaction device 100 includes the provision price calculation unit 151 that calculates the provision price which is the price related to the provision, by comparing the amount and the type of personal information related to the provision with the provision price information which is information in which the amount, the type, and the price of the personal information related to the provision are associated with each other.

Since the information transaction device 100 calculates the provision price related to the provision of the personal information, the user 20 of the information transaction device 100 can easily check the provision price related to the provision.

The information transaction device 100 is connected to the user terminal 200 that is a terminal of the user 20 associated with the personal information. The user terminal 200 includes the approval reception unit 230 that receives the approval of the sharing or the approval of the provision associated with the user 20 from the user 20 having the user terminal 200. The sharing approval reception unit 130 receives the approval of the sharing through the approval reception unit 230 associated with the user 20 associated with the sharing. The provision approval reception unit 131 receives the approval of the provision through the approval reception unit 230 associated with the user 20 associated with the provision.

With the information transaction device 100, the user 20 of the information transaction device 100 can perform the approval of the sharing or the provision of the personal information of the user 20 using the user terminal 200 connected to the information transaction device 100. Accordingly, the effort related to the approval can be reduced.

In addition, the approval reception unit 230 of the user terminal 200 receives the approval of the sharing and the approval of the provision through one application of the user terminal 200.

With the information transaction device 100, the user 20 of the information transaction device 100 can perform the approval of the sharing or the approval of the provision through one application of the user terminal 200. Accordingly, the effort related to the approval can be reduced.

Second Embodiment

Figure 15:
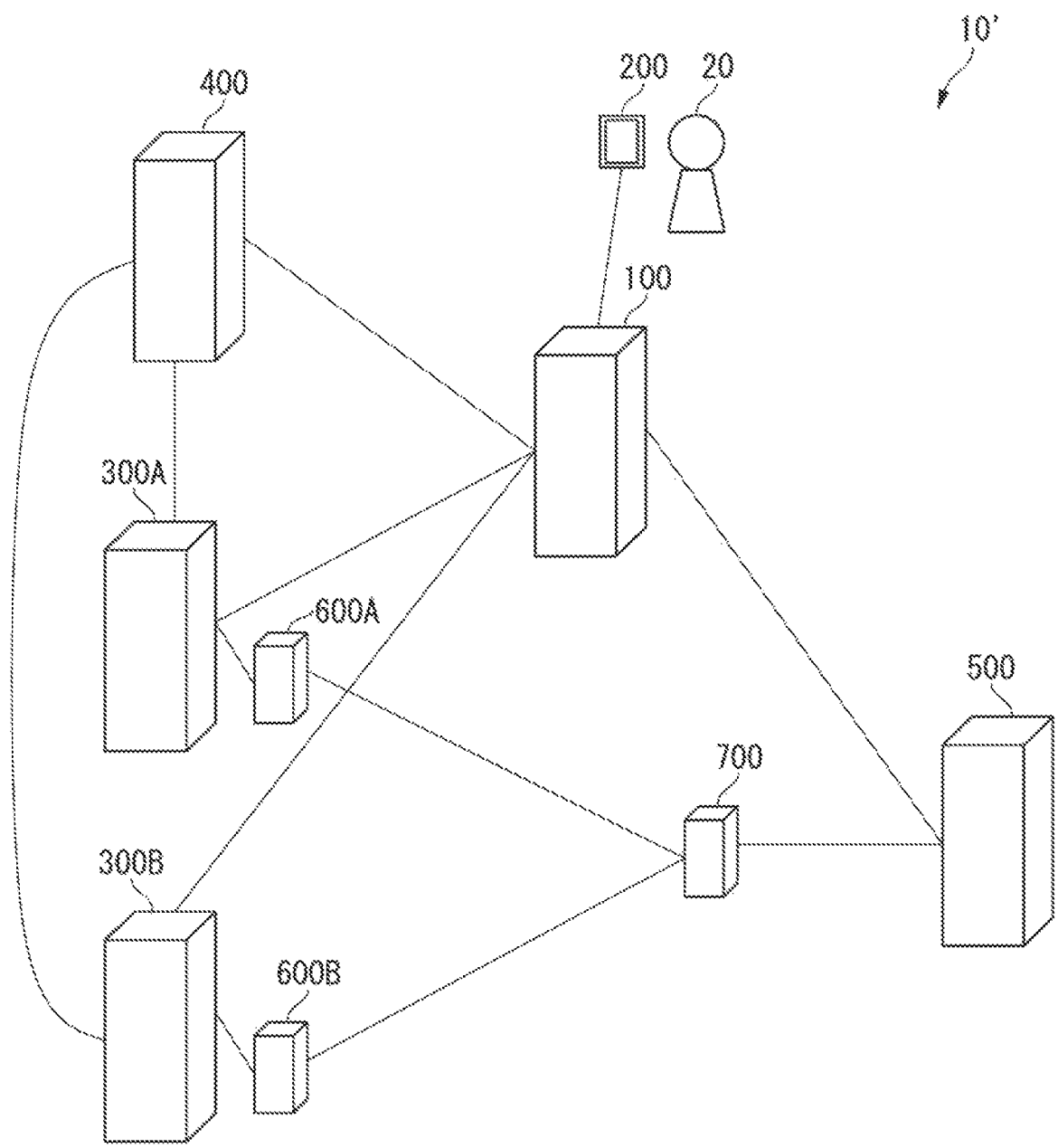
FIG. 15 is a block diagram showing an information transaction system according to a second embodiment.

Hereinafter, an information transaction system 10' according to a second embodiment will be described. A configuration of the information transaction system 10' according to the second embodiment includes an information statistical device 700 in addition to the configuration of the information transaction system 10 according to the first embodiment. FIG. 15 shows the information transaction system 10' according to the second embodiment. While one user 20 is shown in the example in FIG. 15, a plurality of users 20, not shown, and the user terminals 200 (not shown) corresponding in number to the users 20 are present.

Figure 16:
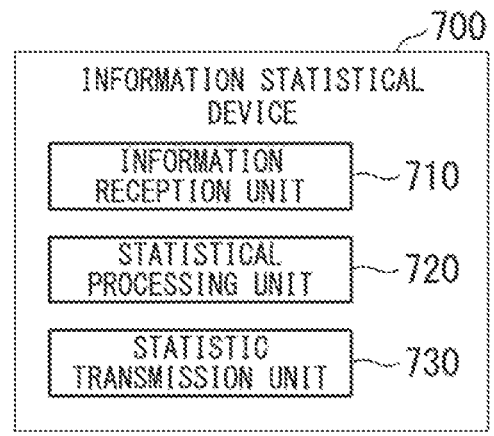
FIG. 16 is a block diagram showing a configuration of an information statistical device according to the second embodiment.

FIG. 16 shows a configuration of the information statistical device 700. The information statistical device 700 includes an information reception unit 710, a statistical processing unit 720, and a statistic transmission unit 730.

<<Configuration of Information Statistical Device 700>

Hereinafter, the configuration of the information statistical device 700 will be described with reference to FIG. 16.

The information reception unit 710 receives the anonymized or pseudonymized personal information from the information processing device 600. The statistical processing unit 720 generates statistical information by performing a statistical process on the personal information received by the information reception unit 710. The statistic transmission unit 730 transmits the statistical information generated by the statistical processing unit 720 to the information provision destination device 500. The number of persons satisfying a certain condition (a range of age, a person diagnosed with a specific disease, or the like), and a distribution of specific data (blood pressure or the like) and a ratio of persons falling outside a normal value range among the persons are exemplary examples of the statistical information.

The statistic transmission unit 730 may transmit both of the personal information anonymized or pseudonymized by the information processing device 600 and the statistical information to the information provision destination device 500.

<<Operational Advantage>>

The information processing device 600 is connected to the information statistical device 700. The information statistical device 700 includes the information reception unit 710 that receives information related to the personal information anonymized or pseudonymized by the processing unit 620 of the information processing device 600, and the statistical processing unit 720 that generates the statistical information by performing the statistical process based on the information received by the information reception unit 710.

According to the embodiment, the personal information application operator having the information provision destination device 500 can use the information statistical device 700 that generates the statistical information. Thus, the personal information application operator can also use the statistical information related to the personal information.

Other Embodiments

While the first and second embodiments are described above in detail with reference to the drawings, specific configurations are not limited to the above, and various design changes and the like can be made.

In the embodiments, the information processing device 600 that anonymizes the personal information of the user 20 is connected to the information holding device 300. Alternatively, the information transaction device 100 may include a processing unit, and the personal information may not be stored in the information transaction device 100. This processing unit may directly anonymize or pseudonymize the personal information stored in the information holding device 300, and the anonymized or pseudonymized personal information may be provided to the information provision destination device 500.

<Basic Configuration>

Figure 17:
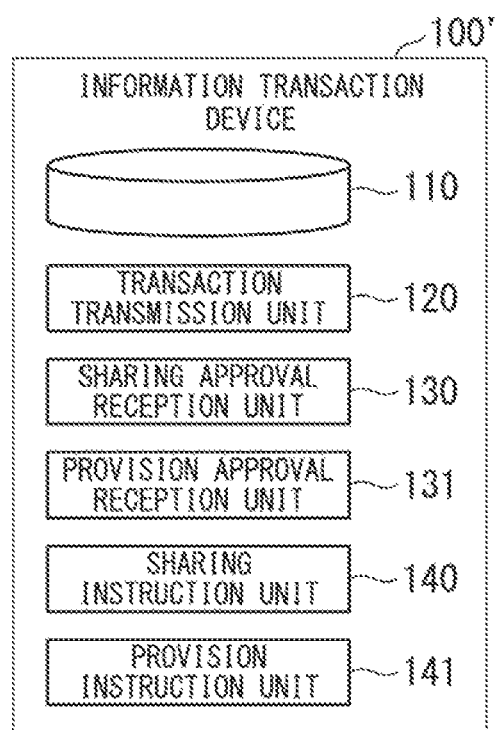
FIG. 17 is a block diagram showing a basic configuration of an information transaction device of the present invention.

Hereinafter, an information transaction device 100' according to a basic configuration will be described. FIG. 17 shows the basic configuration of the information transaction device 100'. The information transaction device 100' according to the basic configuration includes the transaction storage unit 110, the transaction transmission unit 120, the sharing approval reception unit 130, the provision approval reception unit 131, the sharing instruction unit 140, and the provision instruction unit 141.

With the information transaction device 100' according to the basic configuration, the user 20 of the information transaction device 100' can perform the approval of the sharing or the provision of the personal information of the user 20 using the information transaction device 100' that is one device, and the effort related to the approval can be reduced.

Figure 18:
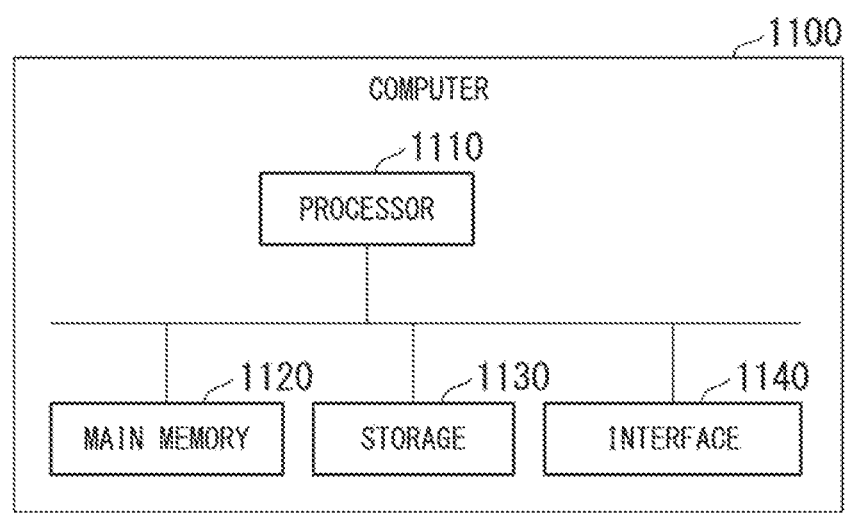
FIG. 18 is a block diagram showing a configuration of a computer according to at least one embodiment.

FIG. 18 is a schematic block diagram showing a configuration of a computer according to at least one embodiment. A computer 1100 includes a processor 1110, a main memory 1120, a storage 1130, and an interface 1140.

The information transaction devices 100 and 100' are installed in the computer 1100. The operation of each of the above processing units is performed by executing a program stored in the storage 1130. The processor 1110 reads the program from the storage 1130, loads the program into the main memory 1120, and executes the above process in accordance with the program. In addition, the processor 1110 secures a storage region corresponding to each of the above storage units in the main memory 1120 in accordance with the program.

The program may implement a part of functions exhibited by the computer 1100. For example, the program may exhibit the functions in combination with another program already stored in the storage 1130 or in combination with another program installed in another device. In another embodiment, the computer 1100 may include a custom large scale integrated (LSI) circuit such as a programmable logic device (PLD) in addition to the above configuration or instead of the above configuration. A programmable array logic (PAL), a generic array logic (GAL), a complex programmable logic device (CPLD), and a field programmable gate array (FPGA) are exemplary examples of the PLD. In this case, a part or all of the functions implemented by the processor 1110 may be implemented by the integrated circuit.

A magnetic disk, a magneto-optical disk, and a semiconductor memory are exemplary examples of the storage 1130. The storage 1130 may be an internal medium directly connected to a bus of the computer 1100 or may be an external medium connected to the computer through the interface 1140 or a communication line. In addition, in a case where the program is distributed to the computer 1100 through the communication line, the computer 1100 receiving the distribution may load the program into the main memory 1120 and execute the above process. In at least one embodiment, the storage 1130 is a non-transitory tangible storage medium.

In addition, the program may implement a part of the above functions. Furthermore, the program may be a so-called difference file (difference program) that implements the above functions in combination with another program already stored in the storage 1130.

Priority is claimed on Japanese Patent Application No. 2019-198431, filed Oct. 31, 2019, the content of which is incorporated herein by reference.

INDUSTRIAL APPLICABILITY

The present invention can be applied to an information transaction device that handles personal information. In the information transaction device handling the personal information, the approval of the sharing of the personal information and the approval of the provision of the personal information can be performed in one device. Thus, the effort related to the approval can be reduced.

REFERENCE SYMBOLS

10, 10': Information transaction system
100, 100': Information transaction device
110: Transaction storage unit
120: Transaction transmission unit
130: Sharing approval reception unit
131: Provision approval reception unit
140: Sharing instruction unit
141: Provision instruction unit
150: Sharing price calculation unit 151: Provision price calculation unit
160: Sharing price distribution unit
161: Provision price distribution unit
170: Report reception unit
180: Request reception unit
200: User terminal
210: Terminal reception unit
220: Output unit
230: Approval reception unit
240: Approval transmission unit
300: Information holding device
310: Storage unit
320: Instruction reception unit
330: Information provision unit
340: Sharing processing unit
400: Information sharing destination device
410: Sharing request reception unit
420: Sharing request transmission unit
430: Instruction notification reception unit
440: Shared information reference unit
500: Information provision destination device
510: Provision destination storage unit
520: Provision request reception unit
530: Provision request transmission unit
540: Provided information reception unit
600: Information processing device
610: Reception unit
620: Processing unit
630: Transmission unit
700: Information statistical device
710: Information reception unit
720: Statistical processing unit
730: Statistic transmission unit
1100: Computer
1110: Processor
1120: Main memory
1130: Storage
1140: Interface

What is claimed is:

1. An information transaction device connected to an information holding device storing personal information, the information transaction device comprising:
a memory storing instructions; and
one or more processors connected to the memory and configured to execute the instructions to:
receive approval of sharing of the personal information by an information sharing destination device from a user associated with the personal information;
receive approval of provision of the personal information to an information provision destination device from the user associated with the personal information;
in a case where the approval of the sharing is received, instruct the information holding device to perform the sharing; and
in a case where the approval of the provision is received, instruct the information holding device to perform the provision,
wherein the information holding device is connected to an information processing device including a memory storing instructions, and one or more processors connected to the memory and configured to execute the instructions to:
receive the personal information;
anonymize or pseudonymize the personal information; and
transmit the anonymized or pseudonymized personal information to the information provision destination device,
wherein the provision is performed by transmitting the personal information to the information provision destination device through the information processing device, and
wherein the information processing device is connected to an information statistical device including a memory storing instructions, and one or more processors connected to the memory and configured to execute the instructions to:
receive information related to the anonymized or pseudonymized personal information; and
generate statistical information by performing a statistical process based on the anonymized or pseudonymized personal information.

2. The information transaction device according to claim 1, wherein the one or more processors are configured to further execute the instructions to:
calculate a sharing price that is a price related to the sharing, by comparing an amount and a type of the personal information related to the sharing with sharing price information that is information in which the amount, the type, and the price of the personal information related to the sharing are associated.

3. The information transaction device according to claim 1, wherein the one or more processors are configured to further execute the instructions to:
calculate a provision price that is a price related to the provision, by comparing an amount and a type of the personal information related to the provision with provision price information that is information in which the amount, the type, and the price of the personal information related to the provision are associated.

4. The information transaction device according to claim 1,
wherein the information transaction device is connected to a user terminal that is a terminal of the user associated with the personal information,
the user terminal includes a memory storing instructions, and one or more processors connected to the memory and configured to execute the instructions to receive the approval of the sharing or the approval of the provision associated with the user from the user having the user terminal,
the approval of the sharing is received in association with the user associated with the sharing, and
the approval of the provision is received in association with the user associated with the provision.

5. The information transaction device according to claim 4,
wherein the approval of the sharing and the approval of the provision is received through one application of the user terminal.

6. An information transaction method comprising:
receiving, by an information transaction device connected to an information holding device which stores personal information, approval of sharing of the personal information by an information sharing destination device, from a user associated with the personal information;
receiving, by the information transaction device, approval of provision of the personal information to an information provision destination device from the user associated with the personal information;

instructing, in a case where the approval of the sharing is received, the information holding device to perform the sharing;

instructing, in a case where the approval of the provision is received, the information holding device to perform the provision;

receiving, by the information holding device, the personal information;

anonymizing or pseudonymizing, by the information holding device, the personal information;

transmitting, by the information holding device, the anonymized or pseudonymized personal information to the information provision destination device, wherein the provision is performed by transmitting the personal information to the information provision destination device through the information processing device;

receiving, by the information processing device, information related to the anonymized or pseudonymized personal information; and generating, by the information processing device, statistical information by performing a statistical process based on the anonymized or pseudonymized personal information.

7. A non-transitory computer readable recording medium storing a program causing an information transaction device, an information holding device storing personal information, and an information processing device to execute:

receiving, by the information transaction device, approval of sharing of the personal information by an information sharing destination device from a user associated with the personal information, or receiving, by the information transaction device, approval of provision of the personal information to an information provision destination device from the user associated with the personal information;

in a case where the approval of the sharing is received, instructing, by the information transaction device, the information holding device to perform the sharing;

in a case where the approval of the provision is received, instructing, by the information transaction device, the information holding device to perform the provision;

receiving, by the information holding device, the personal information;

anonymizing or pseudonymizing, by the information holding device, the personal information;

transmitting, by the information holding device, the anonymized or pseudonymized personal information to the information provision destination device, wherein the provision is performed by transmitting the personal information to the information provision destination device through the information processing device;

receiving, by the information processing device, information related to the anonymized or pseudonymized personal information; and generating, by the information processing device, statistical information by performing a statistical process based on the anonymized or pseudonymized personal information.

\* \* \* \* \*